(12) United States Patent
Fujiwara et al.

(10) Patent No.: US 9,566,847 B2
(45) Date of Patent: Feb. 14, 2017

(54) STRUCTURE FOR REAR PART OF VEHICLE

(71) Applicant: HONDA MOTOR CO., LTD., Tokyo (JP)

(72) Inventors: Makoto Fujiwara, Saitama (JP); Kenichi Hori, Saitama (JP); Eiji Kimura, Saitama (JP); Kousuke Katsumata, Saitama (JP); Yuta Endo, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/778,345

(22) PCT Filed: Mar. 19, 2014

(86) PCT No.: PCT/JP2014/057462
§ 371 (c)(1),
(2) Date: Sep. 18, 2015

(87) PCT Pub. No.: WO2014/148526
PCT Pub. Date: Sep. 25, 2014

(65) Prior Publication Data
US 2016/0272052 A1   Sep. 22, 2016

(30) Foreign Application Priority Data

Mar. 21, 2013   (JP) .................. 2013-057830

(51) Int. Cl.
*B60J 1/20* (2006.01)
*B62D 35/00* (2006.01)
(Continued)

(52) U.S. Cl.
CPC ............... *B60J 1/2008* (2013.01); *B60J 5/101* (2013.01); *B62D 35/007* (2013.01); *B62D 37/02* (2013.01)

(58) Field of Classification Search
CPC ......... B60J 5/101; B60J 1/2008; B62D 35/007
(Continued)

(56) References Cited

U.S. PATENT DOCUMENTS 4,081,195 A * 3/1978 Gotz .................... B62D 35/007
                                                           296/180.1
5,287,004 A    2/1994 Finley
(Continued)

FOREIGN PATENT DOCUMENTS

CN        1895947 A       1/2007
CN      202345797 U       7/2012
(Continued)

OTHER PUBLICATIONS

International Search Report dated May 13, 2014, issued in counterpart International Application No. PCT/JP2014/057462 (2 pages).
(Continued)

*Primary Examiner* — Jason S Morrow
(74) *Attorney, Agent, or Firm* — Westerman, Hattori, Daniels & Adrian, LLP

(57) ABSTRACT

A rear opening is provided in the rear part of a vehicle, and a tailgate opens and closes the rear opening. A spoiler is provided at the upper end of the tailgate. Deflectors are provided below the spoiler. The deflectors extend downward along the outer surface of the tail gate from the lower surface of the spoiler and are disposed at positions offset by a predetermined distance from the opposite ends in the vehicle width direction of the spoiler toward a central portion in the vehicle width direction of the spoiler.

10 Claims, 16 Drawing Sheets

(51) Int. Cl.
 *B62D 37/02* (2006.01)
 *B60J 5/10* (2006.01)

(58) Field of Classification Search
 USPC .................. 296/56, 146.8, 180.1, 181.5
 See application file for complete search history.

(56) References Cited

U.S. PATENT DOCUMENTS

| | | | |
|---|---|---|---|
| 2009/0008961 A1* | 1/2009 | Thomas | B62D 35/007 |
| | | | 296/180.1 |
| 2010/0026045 A1 | 2/2010 | Thomas | |
| 2015/0291232 A1* | 10/2015 | Watanabe | B62D 35/007 |
| | | | 296/180.1 |
| 2016/0152287 A1* | 6/2016 | Fuchs | B62D 35/007 |
| | | | 296/180.1 |
| 2016/0176271 A1* | 6/2016 | Rejc | B22D 21/04 |
| | | | 296/146.5 |
| 2016/0221614 A1* | 8/2016 | Demange | B62D 35/007 |

FOREIGN PATENT DOCUMENTS

| | | |
|---|---|---|
| CN | 202806908 U | 3/2013 |
| DE | 10 2005 008 882 A1 | 8/2008 |
| DE | 10 2007 032 322 A1 | 1/2009 |
| EP | 1738997 A2 | 1/2007 |
| JP | 58-100875 U | 7/1983 |
| JP | 62-111283 U | 7/1987 |
| JP | 6-122384 A | 5/1994 |
| JP | 08-276871 A | 10/1996 |
| WO | 2011/018566 A1 | 2/2011 |

OTHER PUBLICATIONS

Office Action dated Jul. 6, 2016, issued in corresponding Chinese Application No. 201480017136.1. (5 pages).

Extended (supplementary) European Search Report dated Dec. 13, 2016, issued in counterpart European Patent Application No. 14770906.7. (5 pages).

\* cited by examiner

FIG. 2
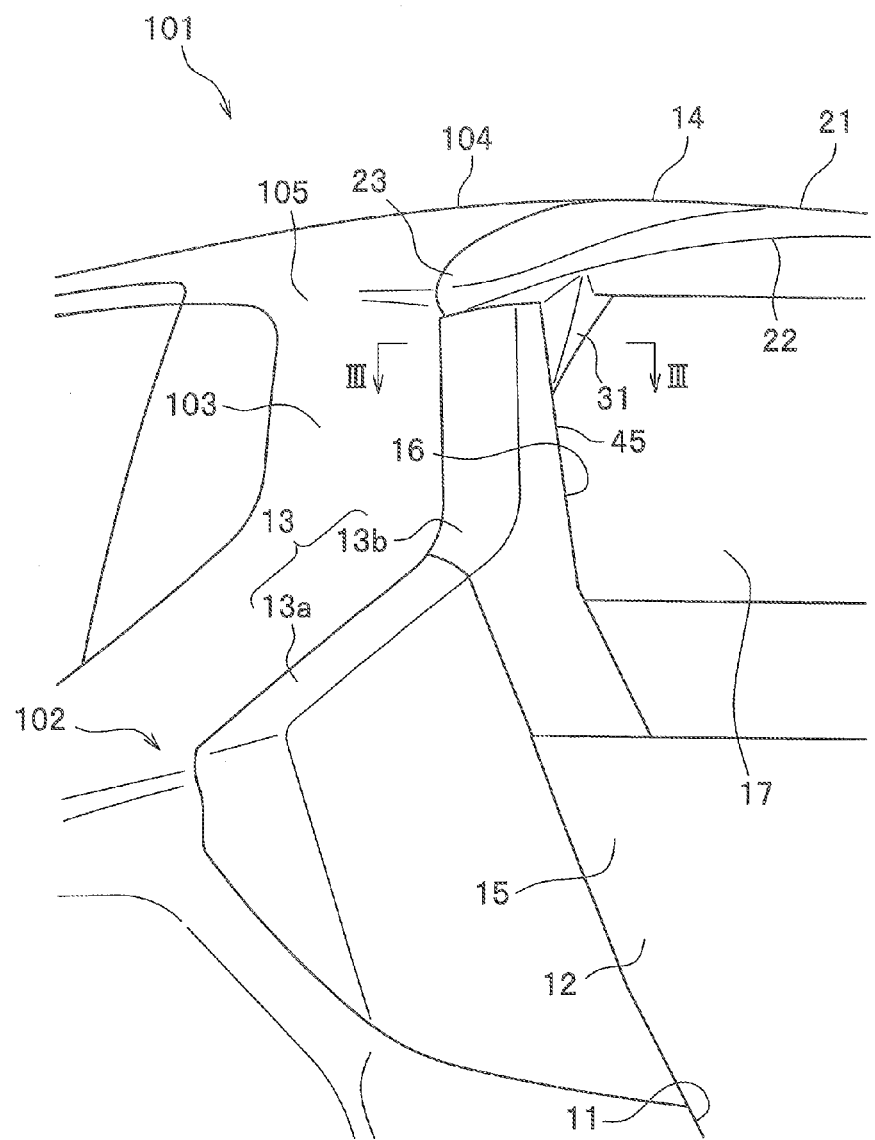
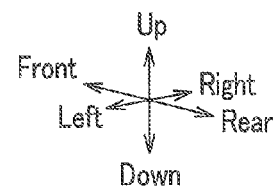

FIG. 5
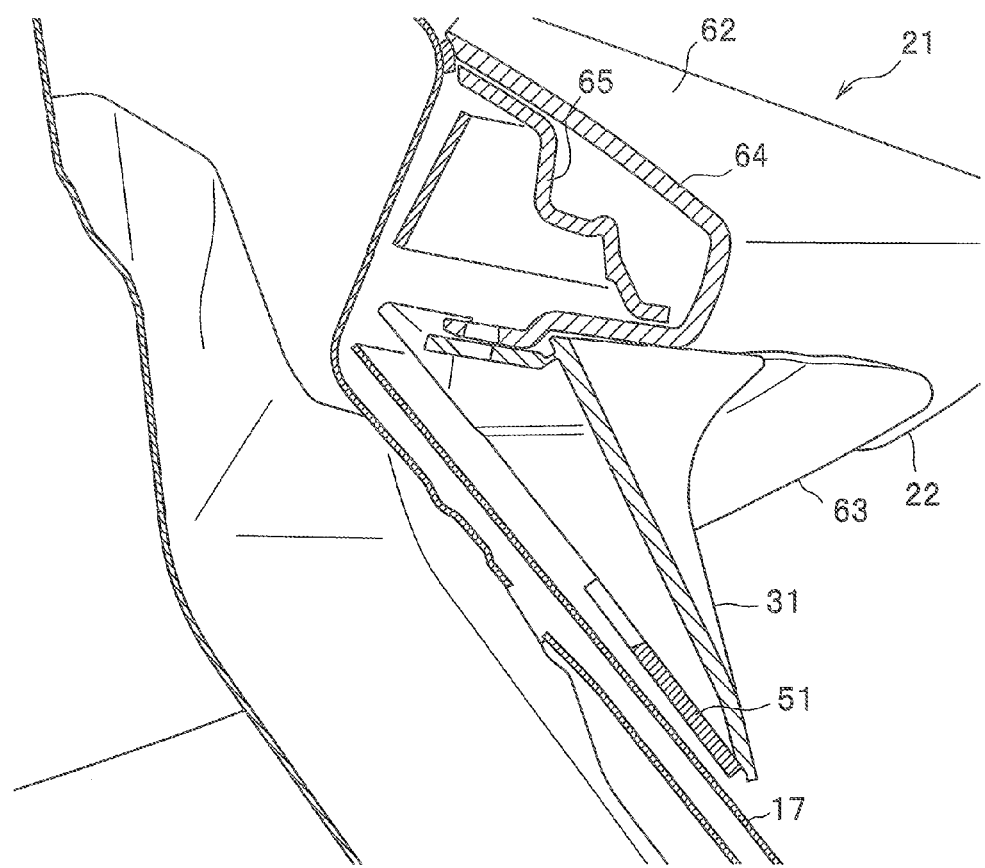
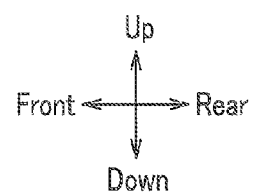

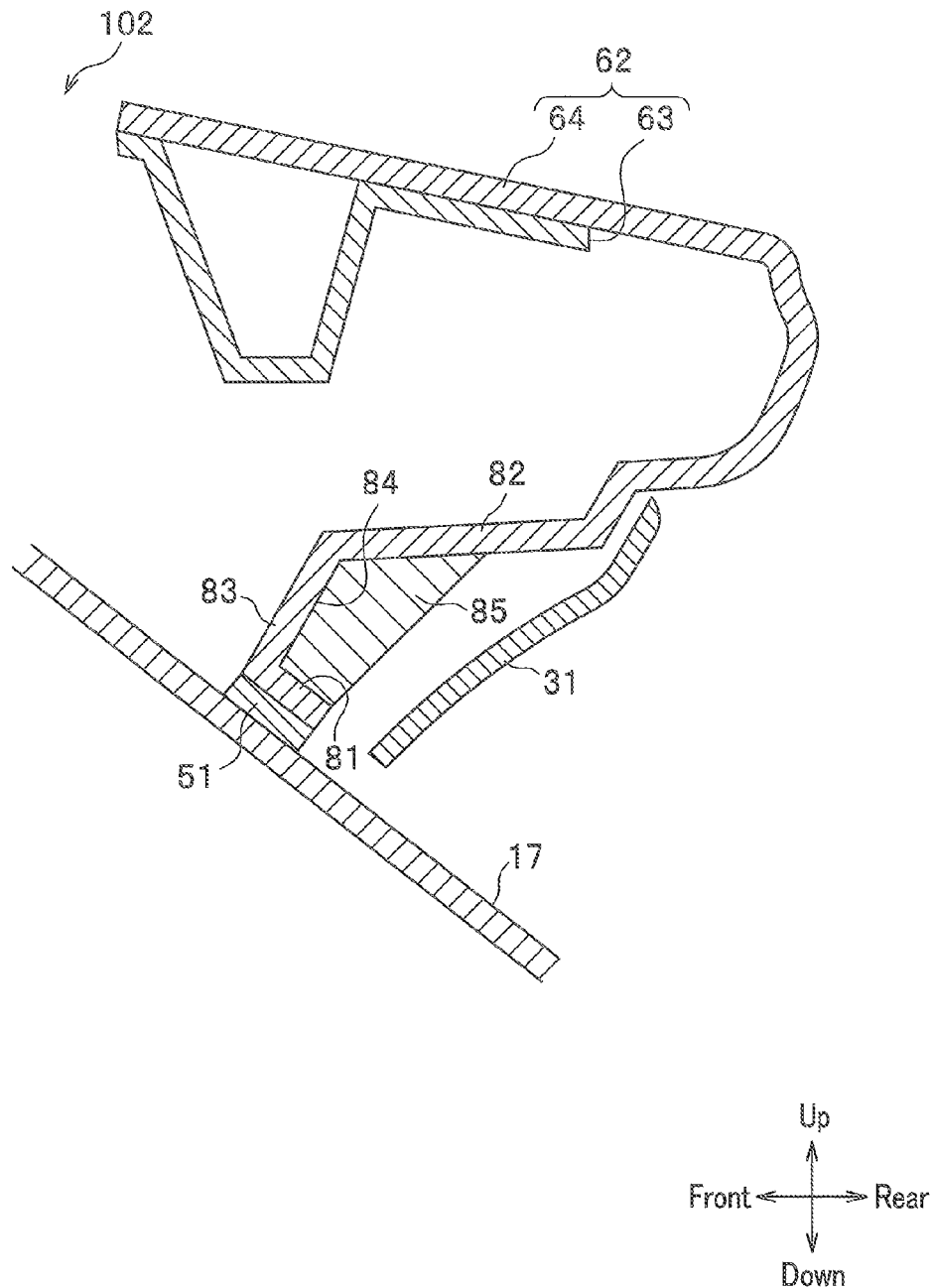

STRUCTURE FOR REAR PART OF VEHICLE

TECHNICAL FIELD

The present invention relates to a structure for a rear part of a vehicle.

BACKGROUND ART

Patent literature 1 discloses a spoiler provided at an upper edge portion of the tailgate of a vehicle and deflectors provided at and extending downward from the opposite ends of a lower surface of the spoiler.

CITATION LIST

Patent Literature

Patent Literature 1: International Patent Application Laid-open No. WO2011/018566

SUMMARY OF INVENTION

Technical Problems to be Solved

When functional parts such as rear combination lamps are to be provided along opposite side edges in the vehicle width direction of the tailgate, providing deflectors at opposite ends of the spoiler causes interference between the functional parts and the deflectors. Thus, the technique of Patent Literature 1 has a problem in that both of functional parts and deflectors cannot be provided in the rear part of a vehicle without interference with each other.

In view of the above, it is an object of the present invention to provide a structure of the rear part of a vehicle in which both of functional parts and deflectors can be provided without interference with each other.

Solution to Problem

To solve the above problem, an aspect of the present invention provides a structure of a rear part of a vehicle including a rear opening provided at a rear part of the vehicle, an openable and closable door for opening and closing the rear opening, a spoiler provided at an upper end portion of the door, a deflector provided below the spoiler, wherein the deflector extends downward from a lower surface of the spoiler along an outer surface of the door and is disposed at a position offset by a predetermined distance from an end in the vehicle width direction of the spoiler toward a central portion in the vehicle width direction of the spoiler.

According to this aspect of the present invention, the deflector is disposed at a position offset by a predetermined distance from an end in the vehicle width direction of the spoiler toward a central portion in the vehicle width direction of the spoiler. Thus, even when functional parts, such as rear combination lamps, are provided along opposite side edges in the vehicle width direction of the door, it is possible to avoid interference between the functional parts and the deflector.

In this case, the door may include a window opening, a window panel provided so as to cover the window opening, a functional part provided outside in the vehicle width direction of the window panel, wherein a lengthwise direction of the functional part extends along a side edge of the window panel. The deflector may be disposed at a position closer to a central portion in the vehicle width direction of the vehicle than an end of the functional part, which end is near the window panel.

According to this aspect of the present invention, the functional part and the deflector are not overlapped, and it is thereby possible to avoid impairing the function of the functional part even with the deflector being provided.

In this case, the functional part may further include a wind directing surface gradually protruding toward a vehicle rear direction with increasing distance from an outer side to a central portion in the vehicle width direction of the vehicle. The deflector may further include a guiding surface gradually protruding toward the vehicle rear direction with increasing distance from the outer side to the central portion in the vehicle width direction of the vehicle. The guiding surface and the wind directing surface may be arranged side by side in the vehicle width direction and formed respectively on the same side in the vehicle width direction of the functional part and the deflector.

According to this aspect of the present invention, the wind directing surface directs traveling wind toward the vehicle rear direction, and the guiding surface can prevent the traveling wind which has left the wind directing surface from being drawn back to the outer surface of the door.

In the above-mentioned cases, the door may include a window opening and a window panel provided so as to cover the window opening, and the deflector may be disposed at a position such that the deflector is overlapped with the window panel as viewed from the vehicle rear.

According to this aspect of the present invention, the deflector is disposed at a position such that the deflector is overlapped with the window panel as viewed from the vehicle rear. This makes it possible to manufacture a vehicle having the deflector and a vehicle not having the deflector, using the same window panel.

In this case, the structure for the rear part of a vehicle may further include an elastic member disposed between the deflector and the window panel.

According to this aspect of the present invention, the elastic member can prevent vibration of the deflector on the window panel and impact noise occurring between the deflector and the window panel.

In the above-mentioned cases, the spoiler may further include: a spoiler body whose surface forms at least a part of an upper surface of the spoiler and forms a part of a lower surface of the spoiler, the spoiler body having an opening formed in the lower surface; and a cover member covering a part of the opening of the spoiler body, and the deflector may cover a part of the remaining part of the opening of the spoiler body.

According to this aspect of the present invention, the cover member for covering the opening of the spoiler body can be of smaller dimensions since the deflector additionally covers the opening.

In this case, the deflector may further include: a fixed portion fastened to the spoiler body in a portion along an edge of the opening of the spoiler body; and, in a portion spaced apart from the edge of the opening of the spoiler body and adjoining to the cover member, an abutted portion on which the cover member abuts from the outside of the vehicle.

According to this aspect of the present invention, it is possible to attach the deflector to the spoiler body firmly by the fixed portion in the portion along the edge of the opening of the spoiler body.

In addition, even while the cover member is detached, the deflector can be held on the spoiler body by means of the fixed portion.

Further, in the portion of the deflector which portion is spaced apart from the edge of the opening and not fixed to the spoiler body by means of the fixed portion, the abutted portion can prevent the deflector from being displaced toward the outside of the vehicle.

Still further, the cover member merely abuts on the deflector at the abutted portion, thus providing the ease of attaching the cover member.

In this case, the abutted portion may be provided in the vicinity of the fixed portion.

This aspect of the present invention allows the cover member to support the deflector further firmly.

In the above-mentioned cases, the spoiler may further include: a spoiler body whose surface forms at least a part of an upper surface of the spoiler and forms a part of a lower surface of the spoiler, the spoiler body having an opening formed in the lower surface; and a cover member covering a part of the opening of the spoiler body, wherein the deflector is integrally formed with the cover member.

According to this aspect of the present invention, the deflector and the cover member are integrally formed. It is thereby possible to reduce the number of necessary component parts and the operating cost for attaching the deflector.

In addition, in contrast to the embodiment in which the deflector and the cover member are separated components, it is possible to indirectly support the deflector additionally at the portions of the spoiler body to which the cover member is attached, and thus fix the deflector firmly.

In this case, the spoiler body may further include a support portion which abuts and is in contact with the outer surface of the door in the vicinity of the deflector.

According to this aspect of the present invention, it is possible for the spoiler body to be firmly supported by the outer surface of the window panel of the door via the support portion in the vicinity of the deflector. This results in higher support rigidity of the deflector.

Also, it makes possible to prevent a collision between the spoiler and the deflector caused by flexure or the like of the spoiler body.

Advantageous Effect of Invention

According to the present invention, it is possible to provide a structure for a rear part of a vehicle in which both of functional parts and deflectors are provided without interference with each other.

BRIEF DESCRIPTION OF DRAWINGS

FIG. 2 is an enlarged perspective view of a rear part of the vehicle according to the first embodiment of the present invention;

FIG. 5 is a cross-sectional view taken along the line V-V in FIG. 4;

FIG. 16 is a vertical cross-sectional view taken along the line XVI-XVI in FIG. 14.

DESCRIPTION OF EMBODIMENTS

Now, embodiments of the present invention will be described with drawings.

First Embodiment

Figure 1:
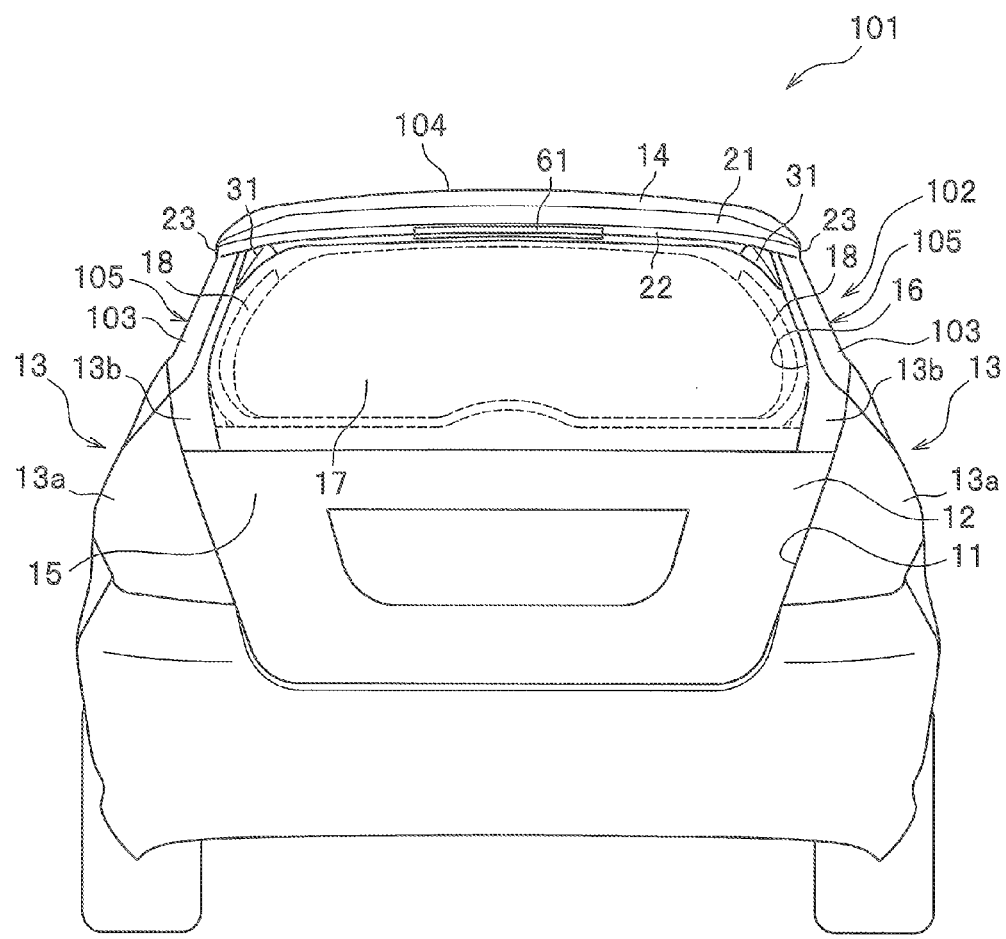
FIG. 1 is a rear view of a vehicle according to a first embodiment of the present invention.

First of all, a structure for a rear part of a vehicle of a first embodiment of the present invention will be described. FIG. 1 is a rear view of a vehicle 101 according to the first embodiment of the present invention. FIG. 2 is an enlarged perspective view of a rear part 102 of the vehicle 101 according to the first embodiment of the present invention. The diagrams starting form FIG. 1 show directions of the vehicle 101 (directions seen from a driver of the vehicle 101) as appropriately.

In the rear part 102 of the vehicle 101 according to the first embodiment, a rear opening 11 communicating with the vehicle interior is formed. The rear opening 11 is openable and closable by a tailgate 12, which serves as an openable and closable door. In a state in which the tailgate 12 is closed, rear combination lights 13, i.e., functional parts, are provided at opposite sides in the vehicle width direction of the rear part 102 of the vehicle 101. The rear combination lights 13 include: a pair of rear combination lights 13a each of which is provided below a corresponding rear pillar 103; and the other pair of rear combination lights 13b each of which is for example provided at corresponding one of opposite sides in the vehicle width direction of the tailgate 12 above the corresponding rear combination light 13a.

A spoiler (tailgate spoiler) 21 is provided at an upper end portion 14 of the tailgate 12. The spoiler 21 rectifies traveling air blowing down from a roof 104 of the vehicle 101 so as to prevent the traveling air from being drawn to the rear part of the vehicle 101. Below the spoiler 21, deflectors 31 are provided. Each of the deflectors 31 rectifies traveling air blowing from a side surface 105 of the vehicle 101 so as to prevent the air from being drawn to the rear part of the vehicle.

Each of the deflectors 31 extends downward from a lower surface 22 of the spoiler 21 along an outer surface 15 of the tailgate 12. The deflector 31 is disposed at a position offset by a predetermined distance from an end 23 in the vehicle width direction of the spoiler 21 toward a central portion in the vehicle width direction of the spoiler 21. More specifically, the deflector 31 is disposed at a position closer to the central portion in the vehicle width direction of the vehicle than an end portion 45 of the corresponding rear combination light 13b, which end portion 45 is near a window panel 17 (see also FIG. 3). The tailgate 12 includes a window opening 16 and the window panel 17 provided so as to cover the window opening 16. The rear combination light 13b is provided outside in the vehicle width direction of the window panel 17. The lengthwise direction of the rear combination light 13b extends along a side edge 18 (see FIG. 1) of the window panel 17, and the deflector 31 is disposed at a position closer to the central portion than the side edge 18 in the vehicle width direction of the window panel 17.

According to the above-described structure of the rear part 102 of the vehicle 101, each of the deflectors 31 is disposed at a position offset by a predetermined distance from the corresponding end 23 in the vehicle width direction of the spoiler 21 toward a central portion in the vehicle width direction of the spoiler 21. This allows an arrangement of the rear combination lights 13b along the side edges in the vehicle width direction of the tailgate 12 without causing interference between the rear combination lights 13b and the deflectors 31. Thus, since the rear combination lights 13b and the deflectors 31 are not overlapped, a third person is able to recognize light emitting from the rear combination lights 13b even with the deflectors 31 being provided, and it is thereby possible to not impair the function of the lights.

Figure 3:
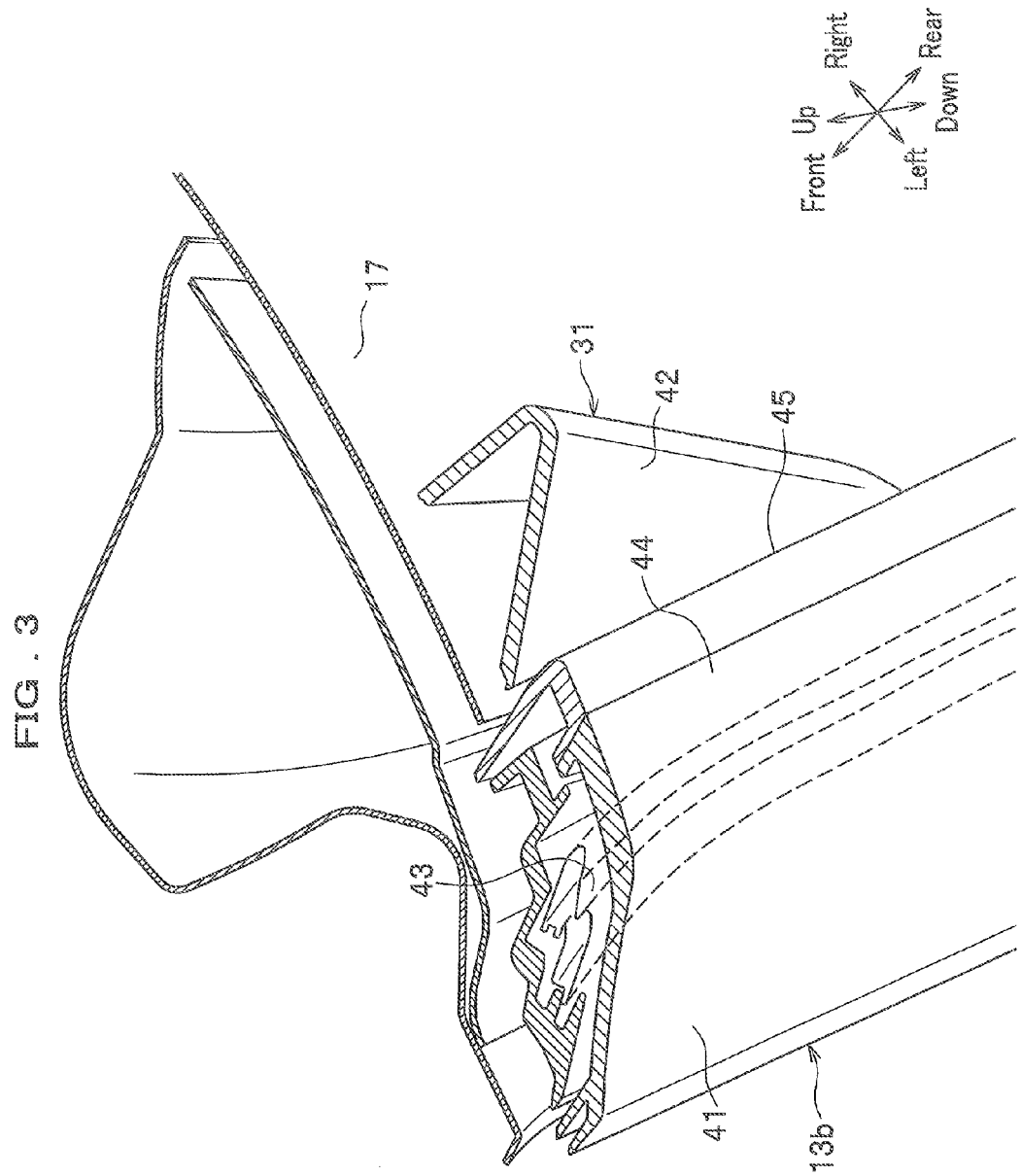
FIG. 3 is an enlarged perspective view of the rear part of the vehicle partially cut away along the line III-III in FIG. 2.

FIG. 3 is an enlarged perspective view of the rear part 102 of the vehicle 101 partially cut away along the line III-III in FIG. 2. As shown in FIG. 3, on an outer surface of each of the rear combination lights 13b, a wind directing surface 41 is formed gradually protruding toward a vehicle rear direction with increasing distance from an outer side to a central portion in the vehicle width direction of the vehicle. On the corresponding deflector 31, a guiding surface 42 is formed gradually protruding toward the vehicle rear direction with increasing distance from the outer side to the central portion in the vehicle width direction of the vehicle. The wind directing surface 41 and the guiding surface 42 are arranged side by side in the vehicle width direction (see FIGS. 2 and 3). The wind directing surface 41 and the guiding surface 42 arranged side by side in the vehicle width direction are formed respectively on the same side in the vehicle width direction of the rear combination light 13b and the deflector 31 (see FIG. 3).

In the above-described structure of the guiding surface 42 and wind directing surface 41, the wind directing surface 41 directs traveling wind toward the rear direction of the vehicle 101, and the guiding surface 42 can prevent the traveling wind which has left the wind directing surface 41 from being drawn back to the outer surface 15 of the tailgate 12.

Incidentally, the rear combination light 13b internally includes a light unit 43 for emitting light. The light unit 43 is provided in a flat portion 44, which is located closer to the central portion in the vehicle width direction of the vehicle than the wind directing surface 41 as viewed from the vehicle rear side. The surface of the flat portion 44 is substantially parallel to the vehicle width direction.

The reason why the light unit 43 is provided at the location of the flat portion 44 rather than the wind directing surface 41 as viewed from the vehicle rear is that the light emitting from the flat portion 44 allows the rear combination light 13b to be seen more clearly than if light is emitted from the wind directing surface 41 having a slope in the vehicle width direction.

Also as shown in FIG. 3, the deflector 31 is disposed at a position such that the deflector 31 is overlapped with the window panel 17 as viewed from the vehicle rear.

Arranging the deflector 31 at a position such that the deflector 31 is overlapped with the window panel 17 as viewed from the vehicle rear enables manufacturing of a vehicle 101 having the deflector 31 and a vehicle 101 not having the deflector 31, using the same window panel 17.

Figure 4:
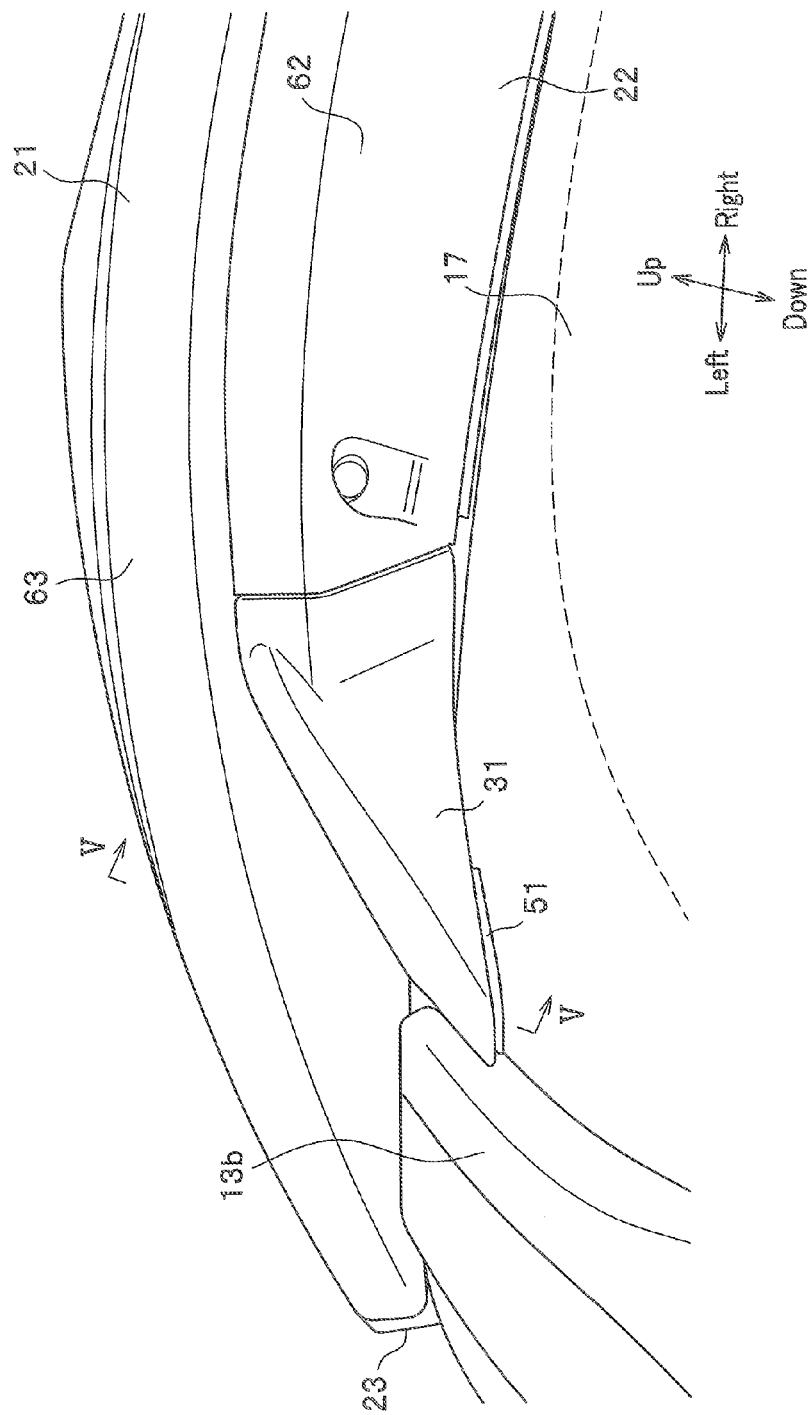
FIG. 4 is an enlarged perspective view in which a deflector according to the first embodiment of the present invention and a surrounding area of the deflector are viewed from a lower side.
Figure 6:
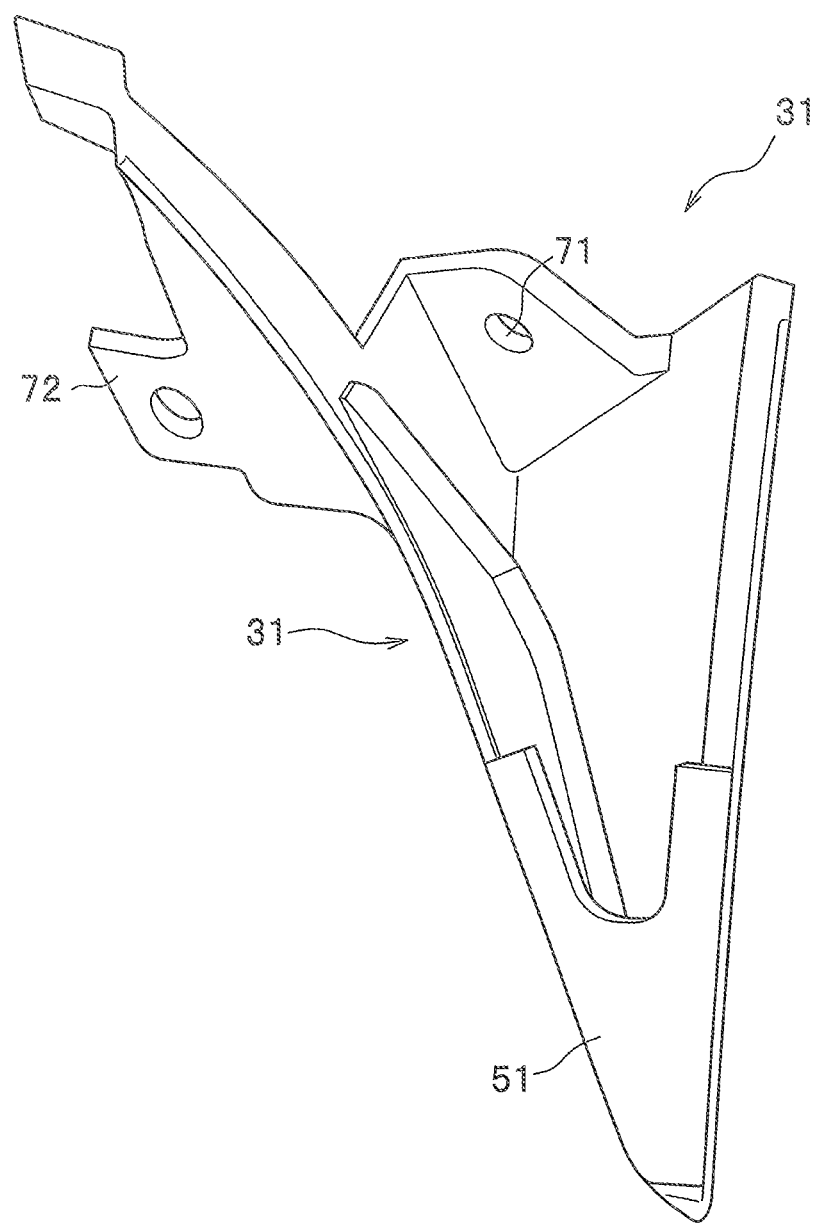
FIG. 6 is a view of the deflector according to the first embodiment of the present invention as viewed from the vehicle front side.

FIG. 4 is an enlarged perspective view in which one of the deflectors 31 and a surrounding area of the deflector are viewed from a lower side. FIG. 5 is a cross-sectional view taken along the line V-V in FIG. 4. FIG. 6 is a view of the deflector 31 as viewed from the vehicle front.

As shown in FIGS. 4 to 6, an elastic member 51 is interposed between the deflector 31 and the window panel 17. The elastic member 51 may be a sponge rubber attached to a vehicle front side of the deflector 31 so as to abut on the outer surface of the window panel 17. Alternatively, the elastic member 51 may be a double-sided tape by which the vehicle front side of the deflector 31 is stuck to the outer surface of the window panel 17. Alternatively, the elastic member 51 may be a surface fastener whose hook surface and loop surface are respectively stuck to the vehicle front side of the deflector 31 and the outer surface of the window panel 17 so that the deflector 31 is detachably supported by the window panel 17.

Interposing the elastic member 51 between the deflector 31 and the window panel 17 as described makes it possible to prevent vibration of the deflector 31 on the window panel 17 and impact noise occurring between the deflector 31 and the window panel 17.

Figure 7:
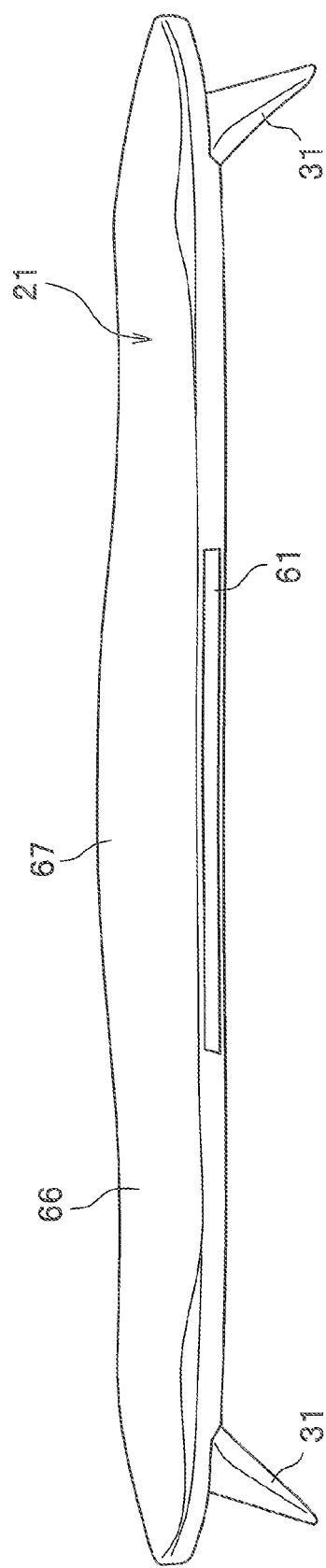
FIG. 7 is a perspective view of the deflectors and a spoiler according to the first embodiment of the present invention as viewed from the vehicle rear side.

FIG. 7 is a perspective view of the spoiler 21 and the deflectors 31 as viewed from the vehicle rear side. As shown in FIG. 7, the deflectors 31 are attached to the spoiler 21 (details described later). A high-mount stop lamp 61 is formed in a central portion in a lengthwise direction at a rear end edge in a vehicle front-rear direction of the spoiler 21.

Figure 8:
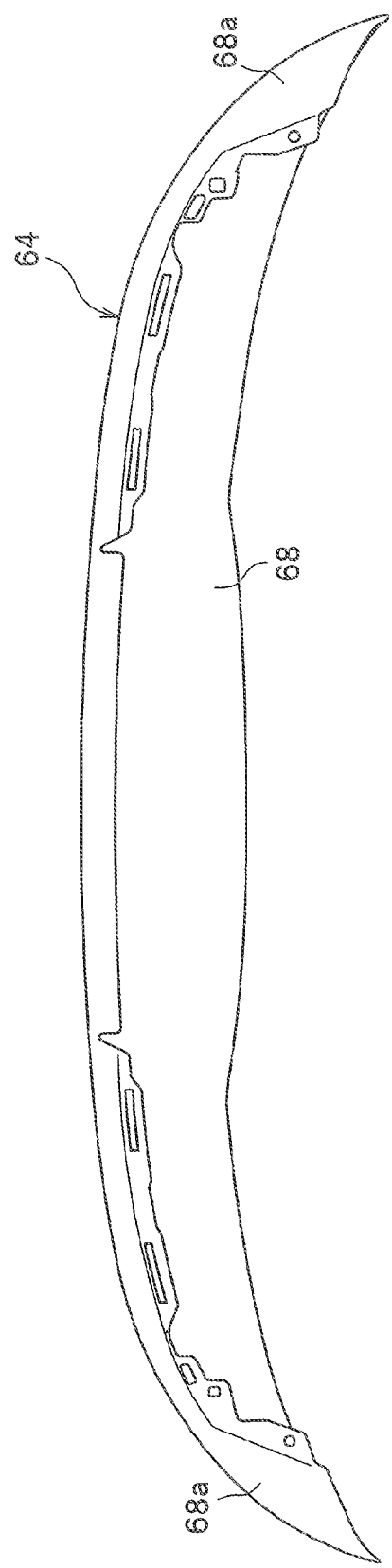
FIG. 8 is a drawing illustrating an outer member according to the first embodiment of the present invention, as viewed from a bottom side of the vehicle.
Figure 9:
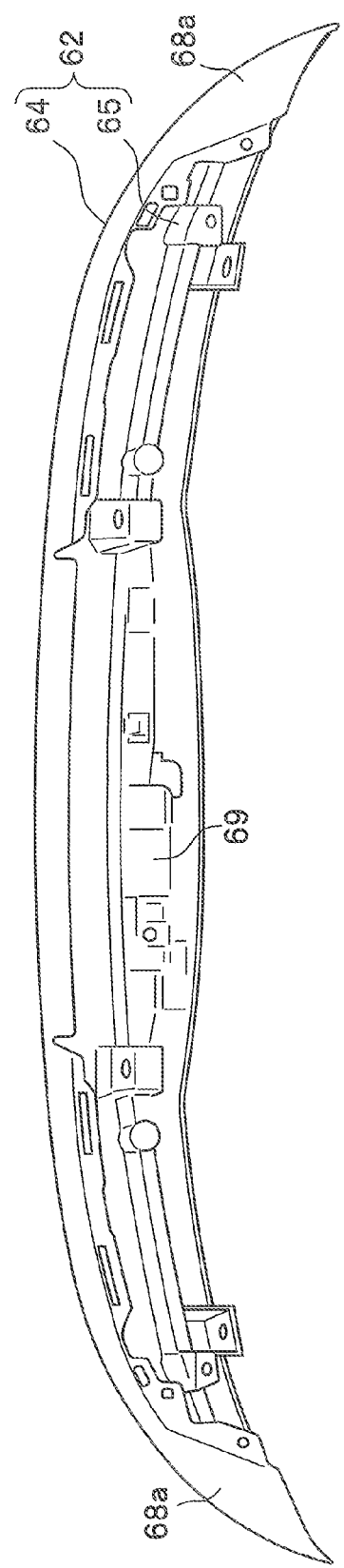
FIG. 9 is a drawing illustrating the spoiler body according to the first embodiment of the present invention as viewed from the bottom side of the vehicle, in which spoiler body an inner member is attached to the outer member.

FIGS. 8 to 11 are diagrams showing the structure of the spoiler 21. The spoiler 21 includes broadly a spoiler body 62 and a cover member 63. The spoiler body 62 includes broadly an outer member 64 and an inner member 65. FIG. 8 is a drawing illustrating the outer member 64 as viewed from the bottom side of the vehicle. FIG. 9 is a drawing illustrating the spoiler body 62 in which the inner member 65 is attached to the outer member 64, as viewed from the bottom side of the vehicle. An upper surface 66 of the spoiler body 62 (outer member 64 of the spoiler body 62) forms at least a part, or whole in this example, of the upper surface 67 of the spoiler 21 (see FIG. 7). Opposite end sides 68a in the vehicle width direction of a lower surface 68 of the spoiler body 62 (outer member 64 of the spoiler body 62) form parts of the lower surface 22 (see FIGS. 1 and 2) of the spoiler 21. The inner member 65 is a component of the spoiler 21, in which component, bosses for attaching to the vehicle 101, bosses for attaching the high-mount stop lamp 61, and the like are collectively disposed. The spoiler body 62 in which the inner member 65 has been attached to the outer member 64 has a large opening 69 formed in the vehicle bottom side of the spoiler body 62 at a central portion in the vehicle width direction of the spoiler body 62. The inner member 65 is exposed from the opening 69.

Figure 10:
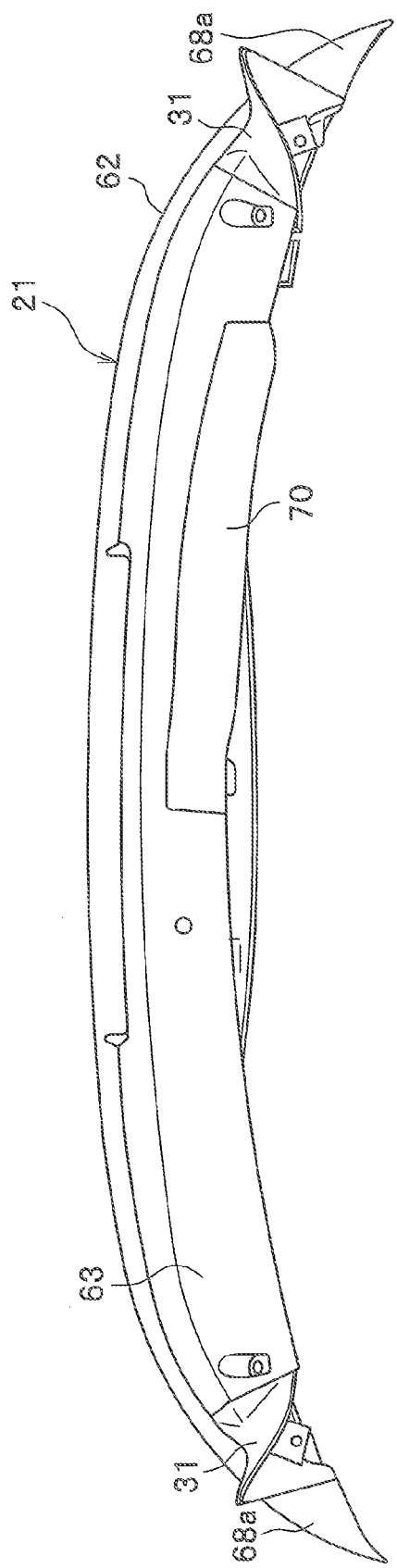
FIG. 10 is a drawing illustrating the spoiler body of FIG. 9 with a cover member and the deflectors covering a central portion in the vehicle width direction of an opening of the spoiler body, as viewed from the bottom side of the vehicle.
Figure 11:
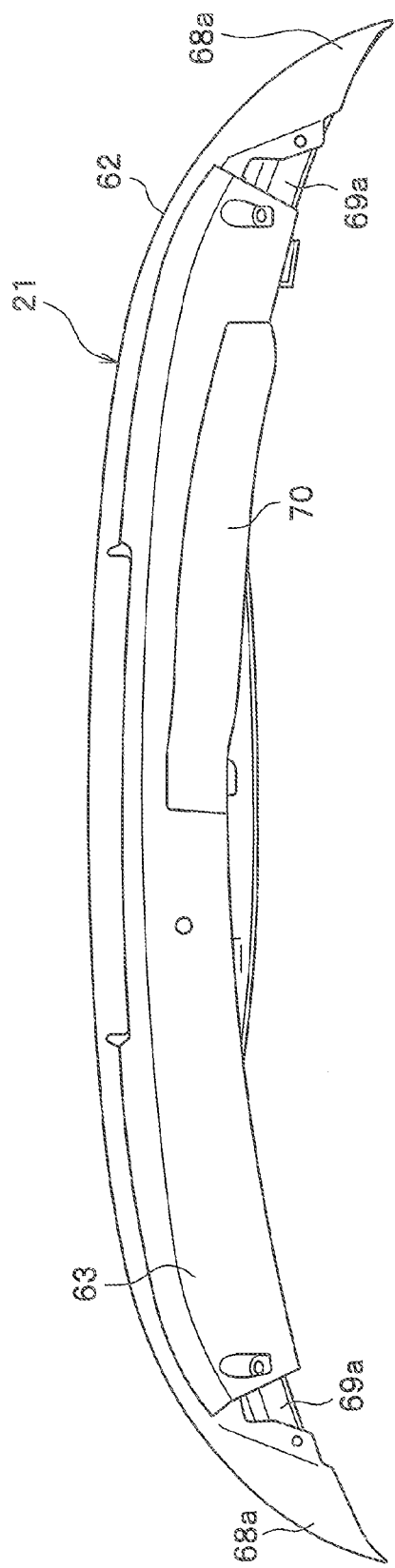
FIG. 11 is a drawing illustrating the spoiler body of FIG. 9 with the cover member solely covering the central portion in the vehicle width direction of the opening of the spoiler body, as viewed from the bottom side of the vehicle.

The cover member 63 is attached to the spoiler body 62 so as to cover a part of the opening 69, i.e., most of a central portion in the vehicle width direction of the opening 69 in this example. The deflectors 31 are attached to the spoiler body 62 so as to cover a part of the remaining part of the opening 69, i.e., end portions opposite in the vehicle width direction of the opening 69 in this example. FIG. 10 is a drawing illustrating a spoiler 21 in which the central portion in the vehicle width direction of the opening 69 of the spoiler body 62 of FIG. 9 has been covered with the cover member 63 and the deflectors 31, as viewed from the bottom side of the vehicle. FIG. 11 is a drawing illustrating a spoiler 21 in which the central portion in the vehicle width direction of the opening 69 of the spoiler body 62 of FIG. 9 has been covered only with the cover member 63, as viewed from the bottom side of the vehicle. In the spoiler 21 shown in FIG. 11, the end portions (opening) 69a opposite in the vehicle width direction of the opening 69 are exposed because the deflectors 31 have not been provided. Incidentally, as shown in FIGS. 10 and 11, a recessed portion 70 is formed on the cover member 63 so as to accommodate a rear wiper not shown.

As described, in the spoiler 21, the deflectors 31 cover the opening 69a of the spoiler body 62, so that the cover member 63 for covering the opening 69 can be of smaller dimensions. As described, in the first embodiment, the opening 69 of the spoiler body 62 is entirely covered with the cover member 63 and a pair of deflectors 31.

Figure 12:
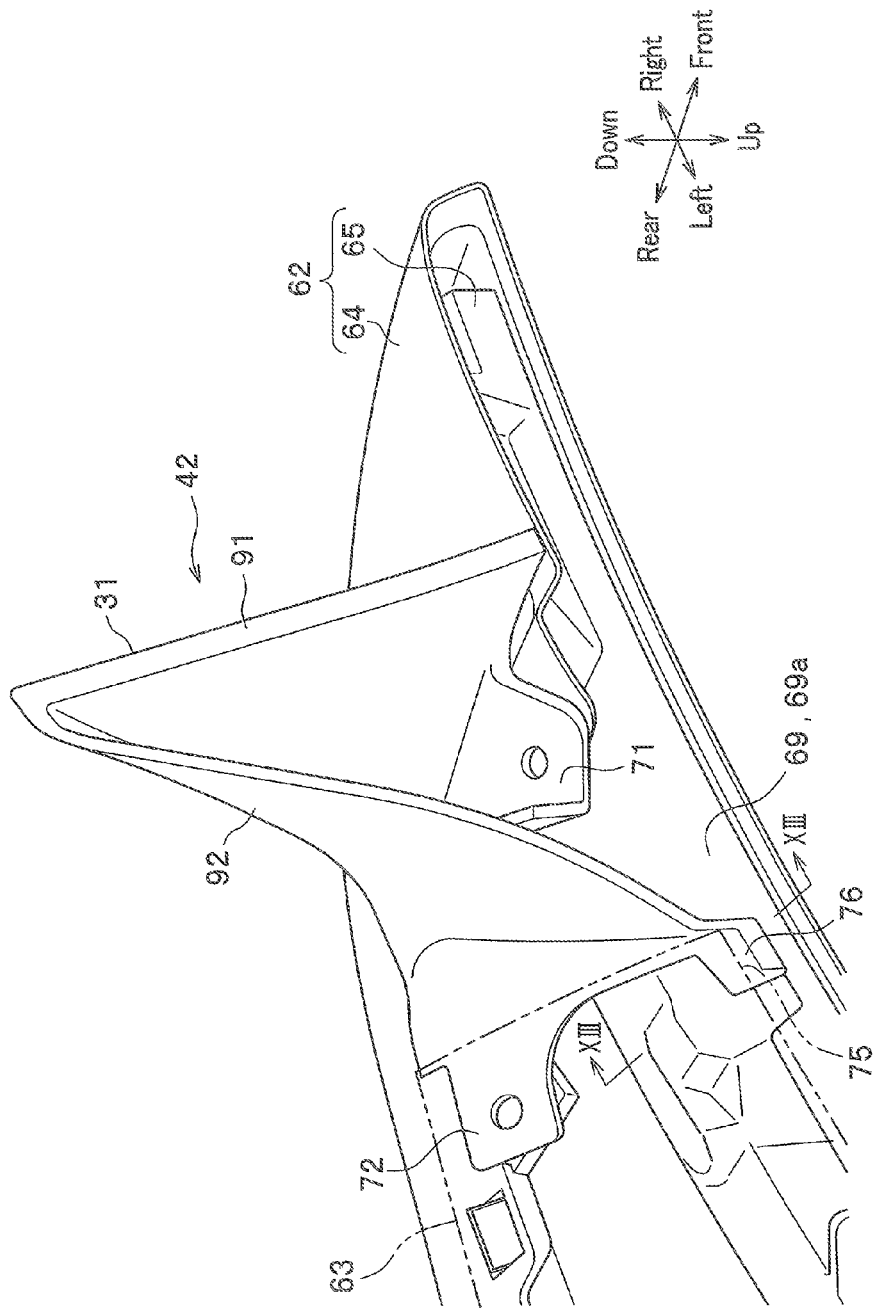
FIG. 12 is an enlarged perspective view of a deflector-attaching portion of the spoiler according to the first embodiment of the present invention.
Figure 13:
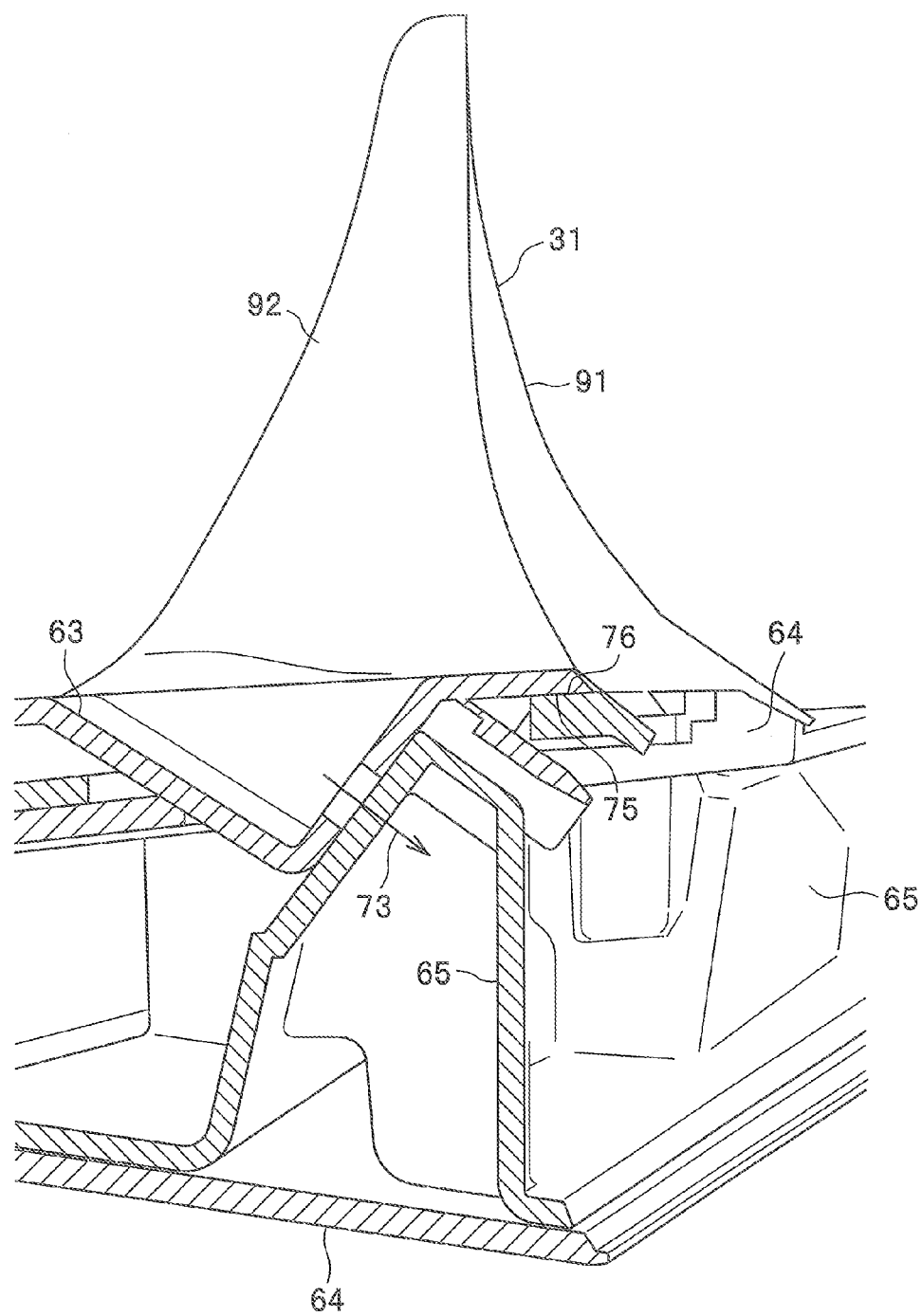
FIG. 13 is a cross-sectional view taken along the line XIII-XIII in FIG. 12.

Next, the attaching structure of the deflectors 31 to the spoiler 21 will be described. FIG. 12 is an enlarged perspective view of an attaching portion of the spoiler 21 for attaching one of the deflectors 31 to the spoiler 21. FIG. 13 is a cross-sectional view taken along the line XIII-XIII in FIG. 12.

The deflector 31 includes fixed portions 71 and 72. The fixed portion 71 protrudes from a proximal end of a guiding surface forming plate 91, which forms the guiding surface 42, toward a central portion in the vehicle width direction of the vehicle. The guiding surface forming plate 91 is provided with a support plate 92 at an acute angle with the guiding surface forming plate 91. The fixed portion 72 protrudes from a proximal end of the support plate 92 toward a central portion in the vehicle width direction of the vehicle. The fixed portions 71 and 72 are fastened to the spoiler body 62 (outer member 64 of the spoiler body 62) in a portion along an edge of the opening 69 (69a) by means of bolts not shown. Specifically, before attaching the cover member 63 to the spoiler body 62, the deflector 31 is attached to the spoiler body 62 (outer member 64 of the spoiler body 62) at the fixed portions 71 and 72. Then, the spoiler body 62 to which the deflector 31 has been attached but the cover member 63 has not been attached is mounted to the vehicle 101. Next, the cover member 63 is attached to the spoiler body 62 which has been mounted to the vehicle 101 and to which the cover member 63 has not been attached.

When attaching the cover member 63 to the spoiler body 62, as shown in FIG. 13, the cover member 63 is fastened to the spoiler body 62 (inner member 65 of the spoiler body 62) with a bolt not shown as indicated by the arrow 73. In this operation, the cover member 63 is fixed to the spoiler body 62 in a state that an abutting portion 75 of the cover member 63 abuts on an abutted portion 76 of the deflector 31. Namely, in a portion of the deflector 31 which portion is spaced apart from the edge of the opening 69 (69a) and not fixed to the spoiler body 62 by the fixed portions 71 and 72, the abutted portion 76 is pressed by the abutting portion 75 of the cover member 63. The abutted portion 76 is provided relatively close to the fixed portions 71 and 72 (see FIG. 12).

This attaching structure enables the deflector 31 to be firmly attached to the spoiler body 62 (outer member 64 of the spoiler body 62) at the fixed portions 71 and 72 in the portion along the edge of the opening 69 (69a).

In addition, even while the cover member 63 is detached, the deflector 31 can be held on the spoiler body 62 by means of the fixed portions 71 and 72. This makes it possible to mount to the vehicle 101 the spoiler body 62 to which the cover member 63 has not been attached, and then attach the cover member 63 to the spoiler body 62.

Further, in the portion of the deflector 31 which portion is spaced apart from the edge of the opening 69 (69a) and not fixed to the spoiler body 62 by means of the fixed portions 71 and 72, the abutted portion 76 prevents the deflector 31 from being displaced toward the outside of the vehicle.

Still further, at the abutted portion 76, the cover member 63 merely abuts on the deflector 31 with no need of fastening with bolts or the like, thus providing ease of attaching the cover member 63.

In addition, the abutted portion 76 is provided relatively close to the fixed portion 72, allowing the cover member 63 to support the deflector 31 further firmly.

Second Embodiment

Figure 14:
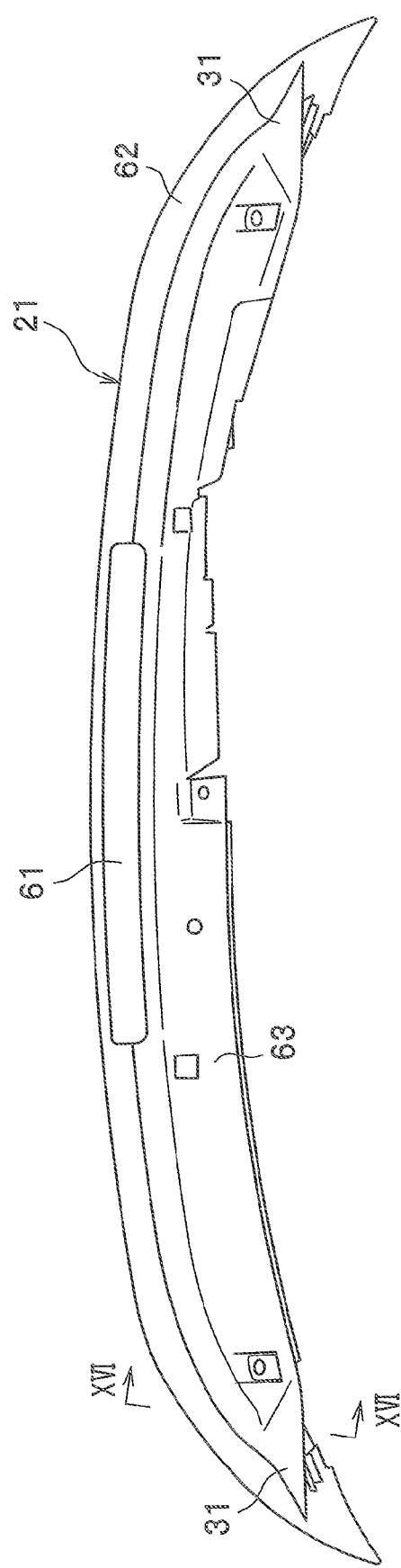
FIG. 14 is a perspective view of a spoiler and deflectors according to a second embodiment of the present invention, as viewed from the bottom side of the vehicle.
Figure 15:
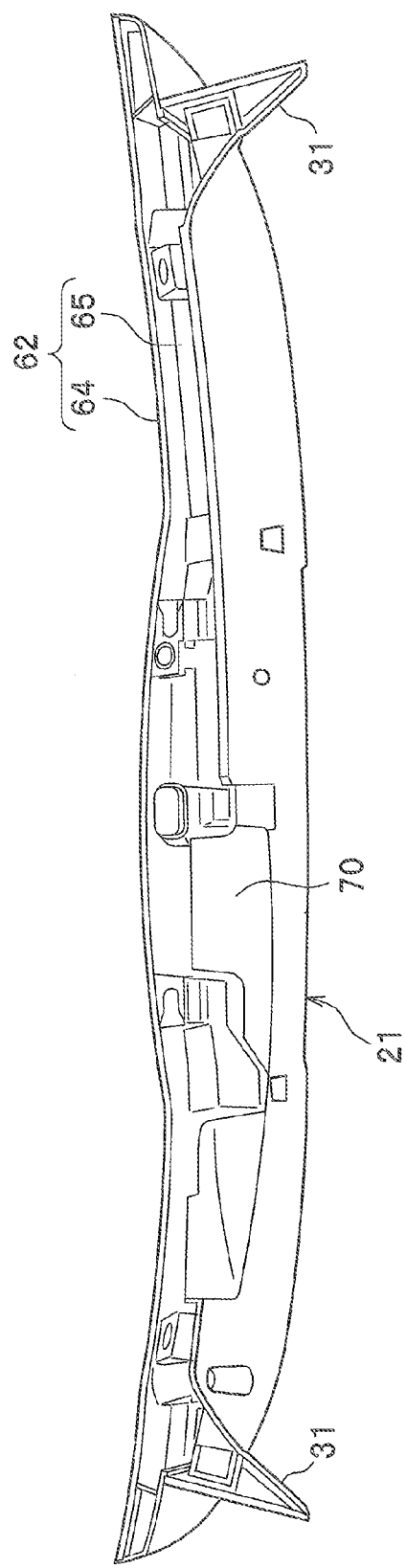
FIG. 15 is a perspective view of the spoiler and the deflectors according to the second embodiment of the present invention, as viewed from the vehicle front side.

Next, a structure of a rear part of a vehicle according to a second embodiment of the present invention will be described. FIG. 14 is a perspective view of a spoiler 21 and deflectors 31 according to the second embodiment as viewed from the rear side of the vehicle. FIG. 15 is a perspective view of the spoiler 21 and the deflectors 31 according to the second embodiment as viewed from the front side of the vehicle. In the subsequent description, the same symbols as those in the above-described first embodiment will be assigned to denote components common to the first embodiment, and their detailed description will be omitted.

The spoiler 21 and the deflectors 31 according to the second embodiment differ from the first embodiment in that the deflectors 31 are integrally formed with a cover member 63.

In the second embodiment, the deflectors 31 and the cover member 63 are integrally formed. It is thereby possible to reduce the number of necessary component parts and the operating cost for attaching the deflectors 31.

In contrast to the first embodiment, in which the deflectors 31 and the cover member 63 are separated components, it is possible to indirectly support the deflectors 31 additionally at the portions of the spoiler body 62 to which the cover member 63 is attached, and thus fix the deflectors 31 thinly.

FIG. 16 is an enlarged vertical cross-sectional view taken along the line XVI-XVI in FIG. 14. The second embodiment also differs from the first embodiment in that the spoiler body 62 (outer member 64) further includes support portions 81 each of which abuts and is in contact with the outer surface of the window panel 17 of the tailgate 12 (FIGS. 1 and 2) in the vicinity of the corresponding deflector 31, and the deflector 31 covers the support portion 81.

More specifically, a lower portion of the outer member 64 includes: a portion 82 extending diagonally downward such as to approach the rear part 102 of the vehicle; a portion 83 extending from a distal end of the portion 82 toward and substantially perpendicular to the window panel 17; and a portion 81 (support portion 81) extending in substantially parallel with the outer surface of the window panel 17 from a distal end of the portion 83 in a diagonally downward direction of the rear part 102 of the vehicle. Further, a rib 85, which serves as a reinforcing member, is disposed in a recess 84 which is formed on the outer member 64 on the side of the deflector 31 and defined by the portion 82, the portion 83, and the support portion 81 of the outer member 64. In addition, an elastic member 51 is interposed between the support portion 81 and the window panel 17. The portion 82, portion 83, support portion 81, and rib 85 are covered by the deflector 31, which is formed integrally with the cover member 63.

In the second embodiment, it is possible for the spoiler body 62 (outer member 64 of the spoiler body 62) to be firmly supported by the outer surface of the window panel 17 of the tailgate 12 via each of the support portions 81 in the vicinity of the corresponding deflector 31. It is thereby possible to achieve high support rigidity of the spoiler body 62 and the deflectors 31. The support rigidity can further be increased by disposing the ribs 85 as described above.

In addition, it is possible for the ribs 85 to prevent a collision between the spoiler body 62 (outer member 64 of the spoiler body 62) and the deflectors 31 caused by flexure or the like of the spoiler body 62 (outer member 64 of the spoiler body 62).

Further, the support portions 81 can be covered by the deflectors 31 so as to be invisible from the outside.

The configuration of the second embodiment other than the above is as same as the first embodiment, and thus detailed description is omitted.

The present invention is needless to say not limited to the above described embodiments, but including various variations. Each of the above described embodiments is merely an embodiment of the present invention.

LIST OF REFERENCE SIGNS

11: Rear opening
12: Tailgate (an openable and closable door)
13b: Rear combination light (functional part)
14: Upper end portion of tailgate
15: Outer surface of tailgate
16: Window opening
17: Window panel
18: Side edge of window panel
21: Spoiler
22: Lower surface of spoiler
23: End in the vehicle width direction of spoiler
31: Deflector
41: Wind directing surface
42: Guiding surface
51: Elastic member
62: Spoiler body
63: Cover member
69: Opening
69a: Part of remaining part of opening
71, 72: Fixed portion
76: Abutted portion
81: Support portion

The invention claimed is:

1. A structure for a rear part of a vehicle, comprising:
a rear opening provided at the rear part of the vehicle;
an openable and closable door for opening and closing the rear opening;
a spoiler provided at an upper end portion of the door; and
a deflector provided below the spoiler,
wherein the deflector extends downward from a lower surface of the spoiler along an outer surface of the door and is disposed at a position offset by a predetermined distance from an end in a vehicle width direction of the spoiler toward a central portion in the vehicle width direction of the spoiler.

2. The structure for a rear part of a vehicle set forth in claim 1,
wherein the door comprises:
a window opening;
a window panel provided so as to cover the window opening; and
a functional part provided outside in the vehicle width direction of the window panel,
wherein a lengthwise direction of the functional part extends along a side edge of the window panel,
and wherein the deflector is disposed at a position closer to a central portion in the vehicle width direction of the vehicle than an end of the functional part, the end of the functional part being near the window panel.

3. The structure for a rear part of a vehicle set forth in claim 2,
wherein the functional part further comprises a wind directing surface gradually protruding toward a vehicle rear direction with increasing distance from an outer side to a central portion in the vehicle width direction of the vehicle,
wherein the deflector further comprises a guiding surface gradually protruding toward the vehicle rear direction with increasing distance from the outer side to the central portion in the vehicle width direction of the vehicle,
and wherein the guiding surface and the wind directing surface are arranged side by side in the vehicle width direction and formed respectively on a same side in the vehicle width direction of the functional part and the deflector.

4. The structure for a rear part of a vehicle set forth in claim 1,
wherein the door comprises:
a window opening; and
a window panel provided so as to cover the window opening,
and wherein the deflector is disposed at a position such that the deflector is overlapped with the window panel as viewed from the vehicle rear.

5. The structure for a rear part of a vehicle set forth in claim 4,
wherein the structure further comprises an elastic member interposed between the deflector and the window panel.

6. The structure for a rear part of a vehicle set forth in claim 1,
wherein the spoiler further comprises:
a spoiler body whose surface forms at least a part of an upper surface of the spoiler and forms a part of a lower surface of the spoiler, the spoiler body having an opening formed in the lower surface; and
a cover member covering a part of the opening of the spoiler body,
and wherein the deflector covers a part of the remaining part of the opening of the spoiler body.

7. The structure for a rear part of a vehicle set forth in claim 6,
wherein the deflector further comprises:
a fixed portion fastened to the spoiler body in a portion along an edge of the opening of the spoiler body; and,
in a portion spaced apart from the edge of the opening of the spoiler body and adjoining to the cover member, an abutted portion on which the cover member abuts from an outside of the vehicle.

8. The structure for a rear part of a vehicle set forth in claim 7,
wherein the abutted portion is provided in the vicinity of the fixed portion.

9. The structure for a rear part of a vehicle set forth in claim 1,
wherein the spoiler further comprises:
a spoiler body whose surface forms at least a part of an upper surface of the spoiler and forms a part of a lower surface of the spoiler, the spoiler body having an opening formed in the lower surface; and
a cover member covering a part of the opening of the spoiler body,
and wherein the deflector is integrally formed with the cover member.

10. The structure for a rear part of a vehicle set forth in claim 9,
wherein the spoiler body further comprises a support portion which abuts and is in contact with the outer surface of the door in the vicinity of the deflector.

\* \* \* \* \*